(12) United States Patent
Lin

(10) Patent No.: US 7,635,112 B2
(45) Date of Patent: Dec. 22, 2009

(54) CONNECTING STRUCTURE OF A HOLDING UNIT AND A CONNECTING ROD FOR AN MP3 DEVICE

(75) Inventor: Chung-Hung Lin, Syuejia Township, Tainan County (TW)

(73) Assignee: Jow Tong Technology Co., Ltd., Tainan Hsien (TW)

( * ) Notice: Subject to any disclaimer, the term of this patent is extended or adjusted under 35 U.S.C. 154(b) by 544 days.

(21) Appl. No.: 11/408,039

(22) Filed: Apr. 21, 2006

(65) Prior Publication Data

US 2007/0246624 A1    Oct. 25, 2007

(51) Int. Cl.
*E04G 3/00* (2006.01)
*B60R 7/00* (2006.01)

(52) U.S. Cl. ............ 248/276.1; 224/555; 224/567; 248/292.12; 379/446; 379/454; 403/84

(58) Field of Classification Search ........... 248/274.1, 248/292.12, 291.2, 276.1, 67, 316.5, 316.6; 403/91, 92, 158, 84, 183; 439/165, 265, 439/668; 379/446, 454, 455; 224/482, 483, 224/455, 544–547, 554, 556, 558, 564–567; 455/575.1, 575.3

See application file for complete search history.

(56) References Cited

U.S. PATENT DOCUMENTS

| | | | | |
|---|---|---|---|---|
| 5,179,590 A * | 1/1993 | Wang | ............... | 379/454 |
| 5,414,770 A * | 5/1995 | Wang | ............... | 379/446 |
| 6,317,497 B1 * | 11/2001 | Ou | ............... | 379/454 |
| 6,591,085 B1 * | 7/2003 | Grady | ............... | 455/42 |
| 6,616,470 B2 * | 9/2003 | Lu et al. | ............... | 439/265 |
| 6,902,436 B2 * | 6/2005 | Liao | ............... | 439/668 |
| 7,292,881 B2 * | 11/2007 | Seil et al. | ............... | 455/575.1 |
| 2005/0006542 A1 * | 1/2005 | Henning et al. | ............... | 248/274.1 |
| 2007/0246624 A1 * | 10/2007 | Lin | ............... | 248/231.9 |

* cited by examiner

*Primary Examiner*—J. Allen Shriver
*Assistant Examiner*—Tan Le
(74) *Attorney, Agent, or Firm*—Rosenberg, Klein & Lee

(57) ABSTRACT

A connecting structure of an MP3 device holding unit and an articulated connecting rod includes a connecting rod, a coupling unit, and a holding unit for holding a MP3 device; the connecting rod has a plug to be inserted in a car cigarette lighter socket; the coupling unit includes an angle main body, and a connecting member, which is connected to a first end portion of the angle main body at one end, and the connecting rod at the other end for allowing the angle main body to be turned relative to the connecting rod; therefore, the holding unit can be pivoted left and right as well as up and down for adjusting orientation of the MP3 device; the holding unit includes a back shell part, and it is connected to a second end of the angle main body so as to be turnable relative to the coupling unit.

5 Claims, 7 Drawing Sheets

CONNECTING STRUCTURE OF A HOLDING UNIT AND A CONNECTING ROD FOR AN MP3 DEVICE

BACKGROUND OF THE INVENTION

1. Field of the Invention

The present invention relates to a connecting structure of a holding unit and a connecting rod for an MP3 device, more particularly one, which allows the holding unit to be turned and pivoted upwards and downwards as well as leftwards and rightwards for adjusting orientation of the MP3 device held on the holding unit such that the MP3 device faces the user.

2. Brief Description of the Prior Art

Various multimedia appliances are developed with progress of technology, e.g. mobile phones, MP3 players, electronic handheld game devices, and PDA. Multimedia devices were provided with docking units in the early days, which can only be used to hold the multimedia devices in position, and can't be connected with other accessories for serving different purposes.

U.S. Pat. No. 6,591,085 taught an "FM TRANSMITTER AND POWER SUPPLY/CHARGING ASSEMBLY FOR MP3 PLAYER". In use, an MP3 player is held on and connected to a main body portion of the FM transmitter and power supply/charging assembly, and the main body portion of the assembly is connected to and held in position by an adaptor, which has an engagement structure engageable with a cavity of the main body portion. Or alternatively, the main body portion of the FM transmitter and power supply/charging assembly can be joined to an articulated ratchet-type adaptor, which has an engagement structure engageable with a second cavity of the main body portion, and has a plug end to be inserted in a socket such as the cigarette lighter socket of a car; the height of the MP3 player will change after the main body portion is connected with the ratchet-type adaptor, and the MP3 player can be pivoted up and down to adjust position together with a movable tubular member of the ratchet-type adaptor. Consequently, the MP3 player can be moved to a proper position, and the user is allowed to operate conveniently regardless of height and orientation of the cigarette lighter socket.

However, the ratchet-type adaptor only allows the MP3 player to be pivoted upwards and downwards; the MP3 player can't be pivoted leftwards and rightwards. Consequently, there is a possibility that the MP3 player can't be adjusted to face the user.

SUMMARY OF THE INVENTION

It is a main object of the invention to provide a connecting structure of a holding unit and a connecting rod for an MP3 device to overcome the above-mentioned problems.

The connecting structure of the present invention includes an articulated connecting rod, a coupling unit, and a holding unit for holding an MP3 device, which connecting rod has a plug to be inserted in a car cigarette lighter socket. The coupling unit includes an angle main body, and a connecting member; the angle main body has first and second end portions perpendicular to each other; the connecting member is connected the first end portion of the angle main body at one end, and connected to the connecting rod at the other end for allowing the angle main body to be turned relative to the connecting rod. Therefore, the holding unit can be pivoted left and right about a vertical axis as well as up and down about a horizontal pivotal axis for adjusting orientation of the MP3 device such that the MP3 device faces the user. The holding unit includes a back shell part, and it is connected to the second end of the angle main body of the coupling unit so as to be turnable relative to the coupling unit.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
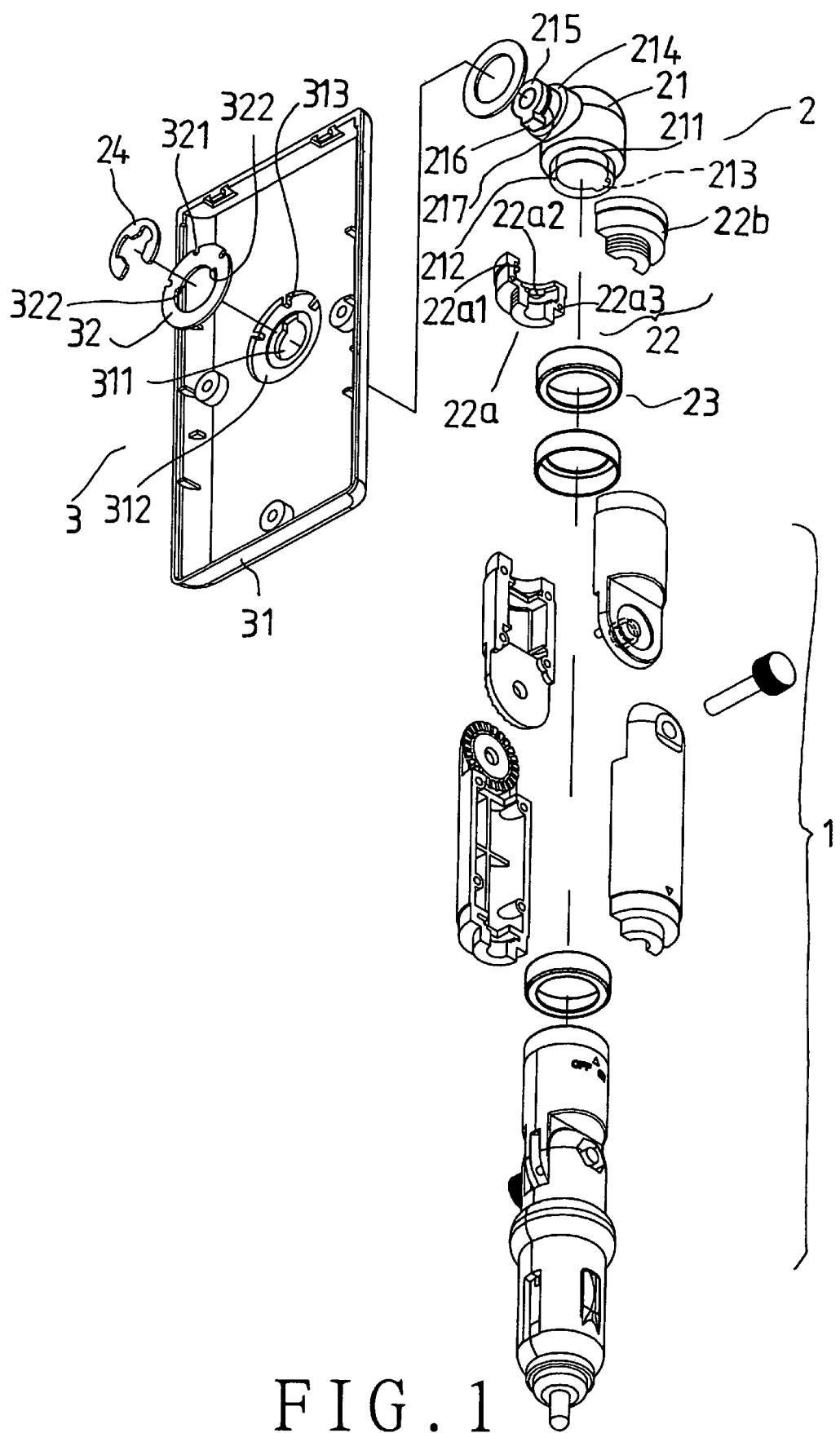
FIG. 1 is an exploded perspective view of the present invention.
Figure 2:
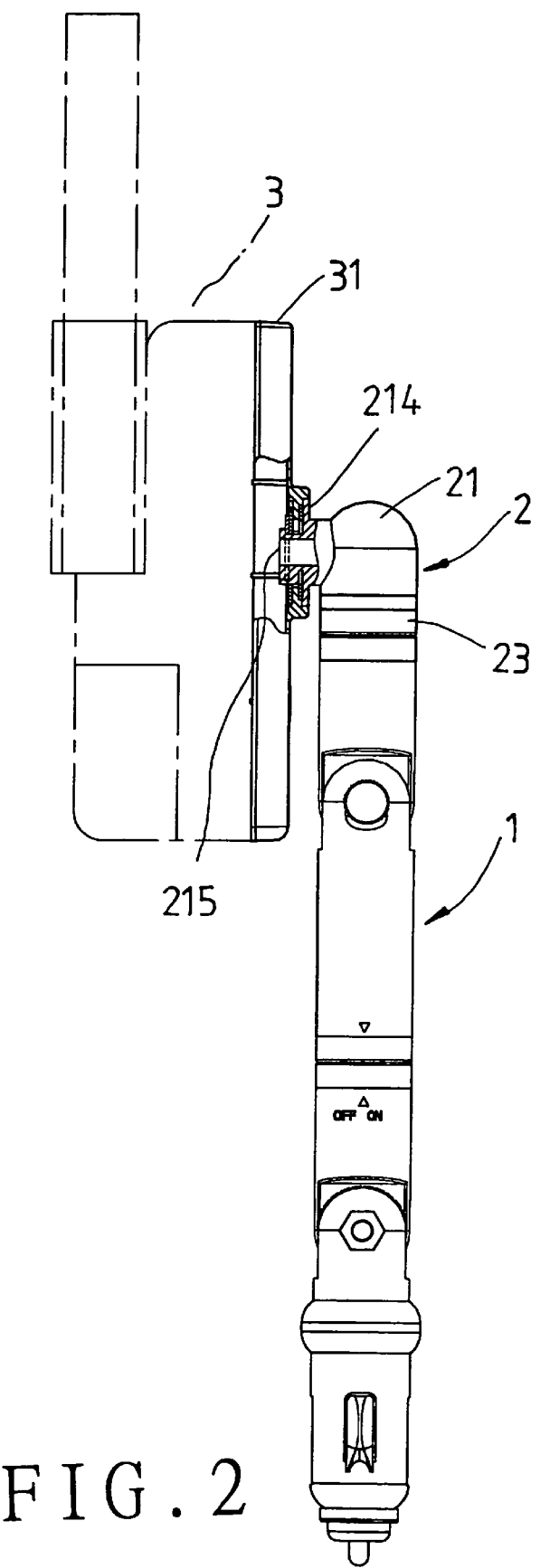
FIG. 2 is a side view of the present invention.
Figure 3:
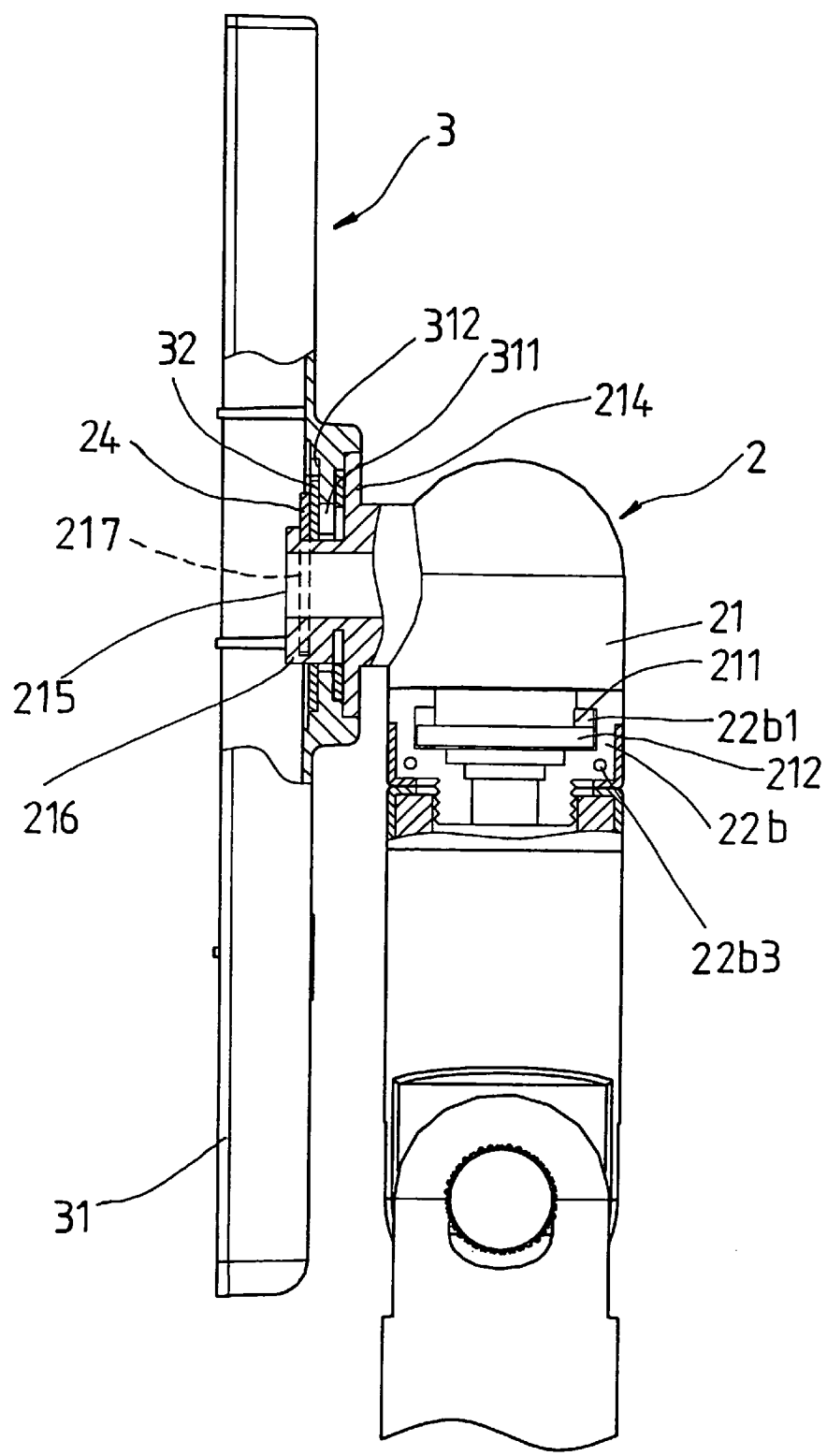
FIG. 3 is a partial side view of the present invention.
Figure 4:
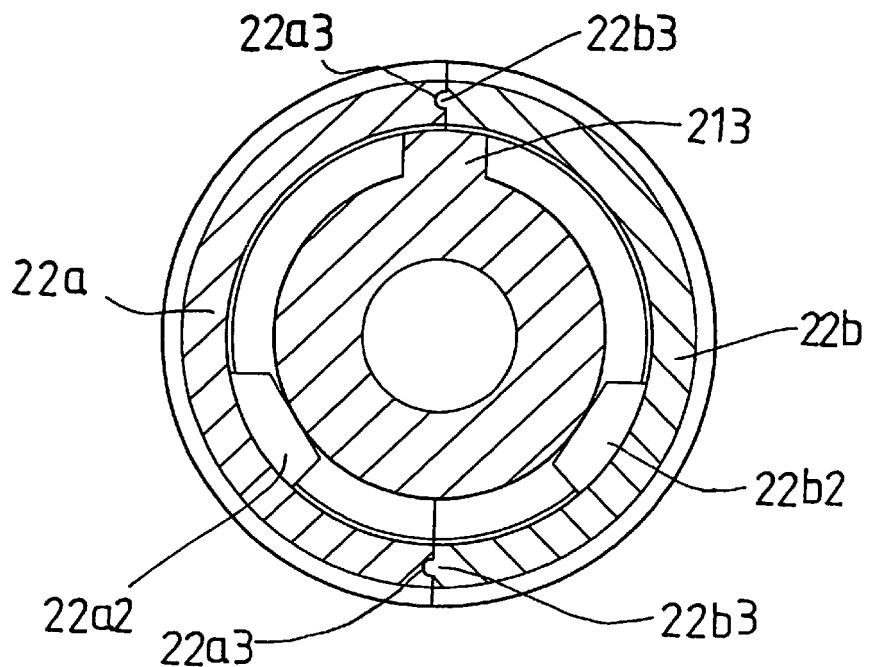
FIG. 4 is a partial horizontal section of the present invention.

Referring to FIGS. 1 to 4, a preferred embodiment of a connecting structure of a holding unit and a connecting rod for an MP3 device includes:

a connecting rod 1, the connecting rod 1 includes an articulated rod part, and a plug for connection to a cigarette lighter socket of a car; the connecting rod 1 isn't the subject of the present invention therefore it won't be detailed hereinafter;

a coupling unit 2, the coupling unit 2 includes an angle main body 21, a connecting member 22, a clamp ring 23, and a C-shaped fastener 24; the angle main body 21 has first and second end portions perpendicular to each other; the first end portion of the angle main body 21 has an annular recess 211, an annular protrusion 212 adjacent to a lower edge of the annular recess 211, and a protrusion 213 on the annular recess 211; the connecting member 22 includes left and right shell parts 22a, 22b; the left shell part 22a has a semicircular recess 22a1 on an inner side, a stopping bump 22a2 on the semicircular recess 22a1, and locating holes 22a3 while the right shell part 22b has a semicircular recess 22b1 on an inner side, a stopping bump 22b2 on the semicircular recess 22b1, and locating protrusions 22b3; the connecting member 22 is positioned around the first end portion of the angle main body 21 with the left and the right shell parts 22a and 22b coupled together such that the protrusion 213 is confined in the recesses 22a1 and 22b1, and the angle main body 21 is angularly displaceable relative to the connecting member 22, and the protrusion 213 will hit the stopping bumps 22a2 and 22b2 while the angle main body 21 is being turned relative to the connecting member 22; the locating protrusions 22b3 will be inserted in respective ones of the locating holes 22a3 when the left and the right shell parts 22a and 22b are coupled together; the clamp ring 23 is positioned around both the left and the right shell parts 22a and 22b to hold the same firmly together; the second end portion of the angle main body 21 has an annular stopping portion 214, an extension portion 215 projecting from the stopping portion 214, a protrusion 216 and a fitting groove 217 on the extension portion 215; and a holding unit 3 for holding an MP3 device, the holding unit 3 includes a back shell part 31, and a flat ring-shaped pad 32; the back shell part 31 has a through hole 311, an encompassing sinking portion 312 around a circumferential edge of the through hole 311, several fixing protrusions 313 on an edge of the sinking portion 312; the flat ring-shaped pad 32 has several gaps 321 on an outward edge thereof, and two stopping protrusions 322 on an inward edge thereof; the flat ring-shaped pad 32 is fitted on the sinking portion 312 with the fixing protrusions 313 of the back shell 31 being passed into respective ones of the gaps 321 to prevent the flat ring-shaped pad 32 from turning relative to the back shell 31.

Figure 6:
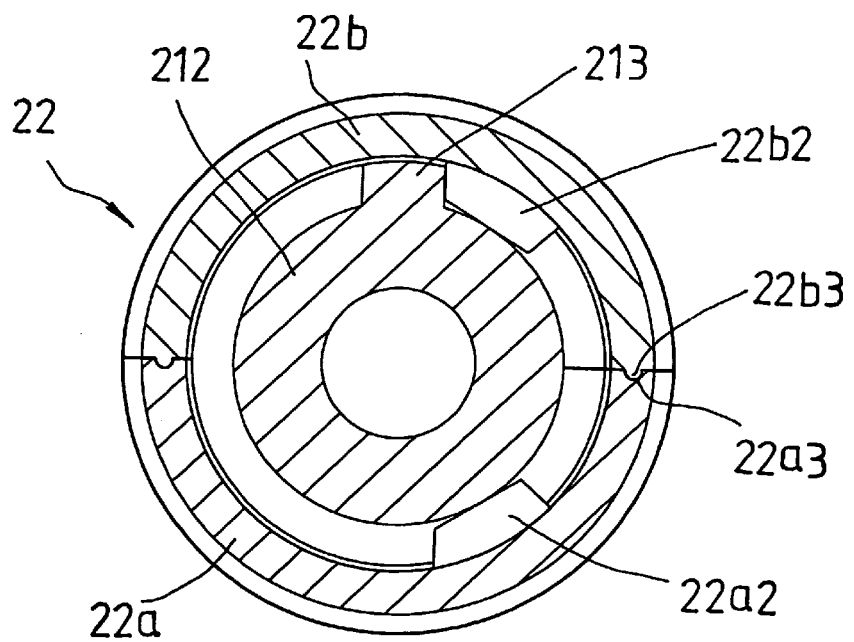
FIG. 6 is a partial horizontal sectional view of the present invention with the coupling unit being turned about a vertical axis.
Figure 5:
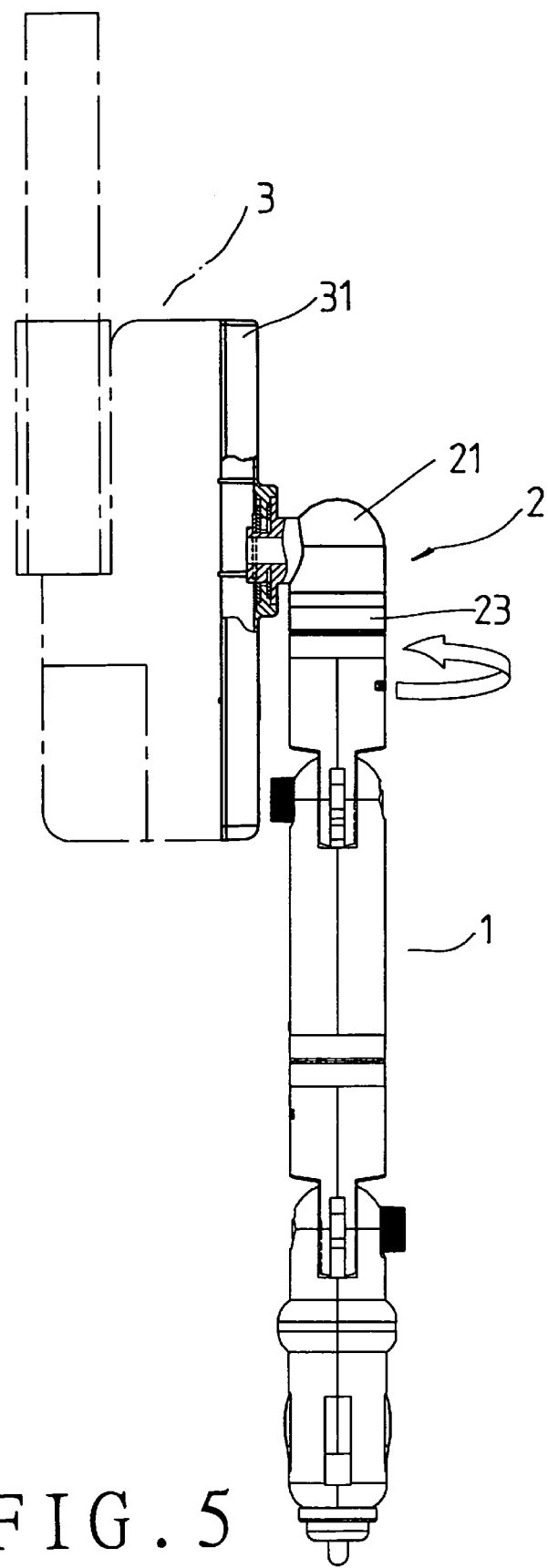
FIG. 5 is a side view of the present invention, with the coupling unit being turned about a vertical axis.
Figure 7:
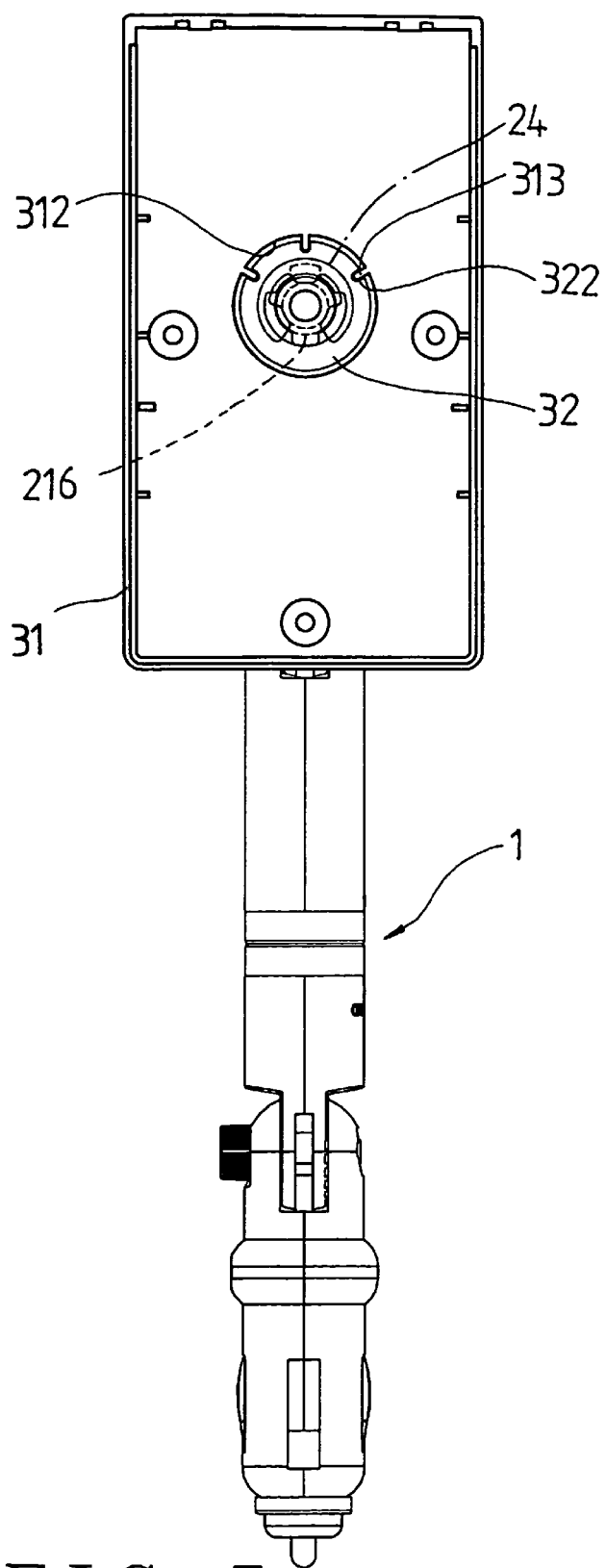
FIG. 7 is a front view of the present invention.
Figure 8:
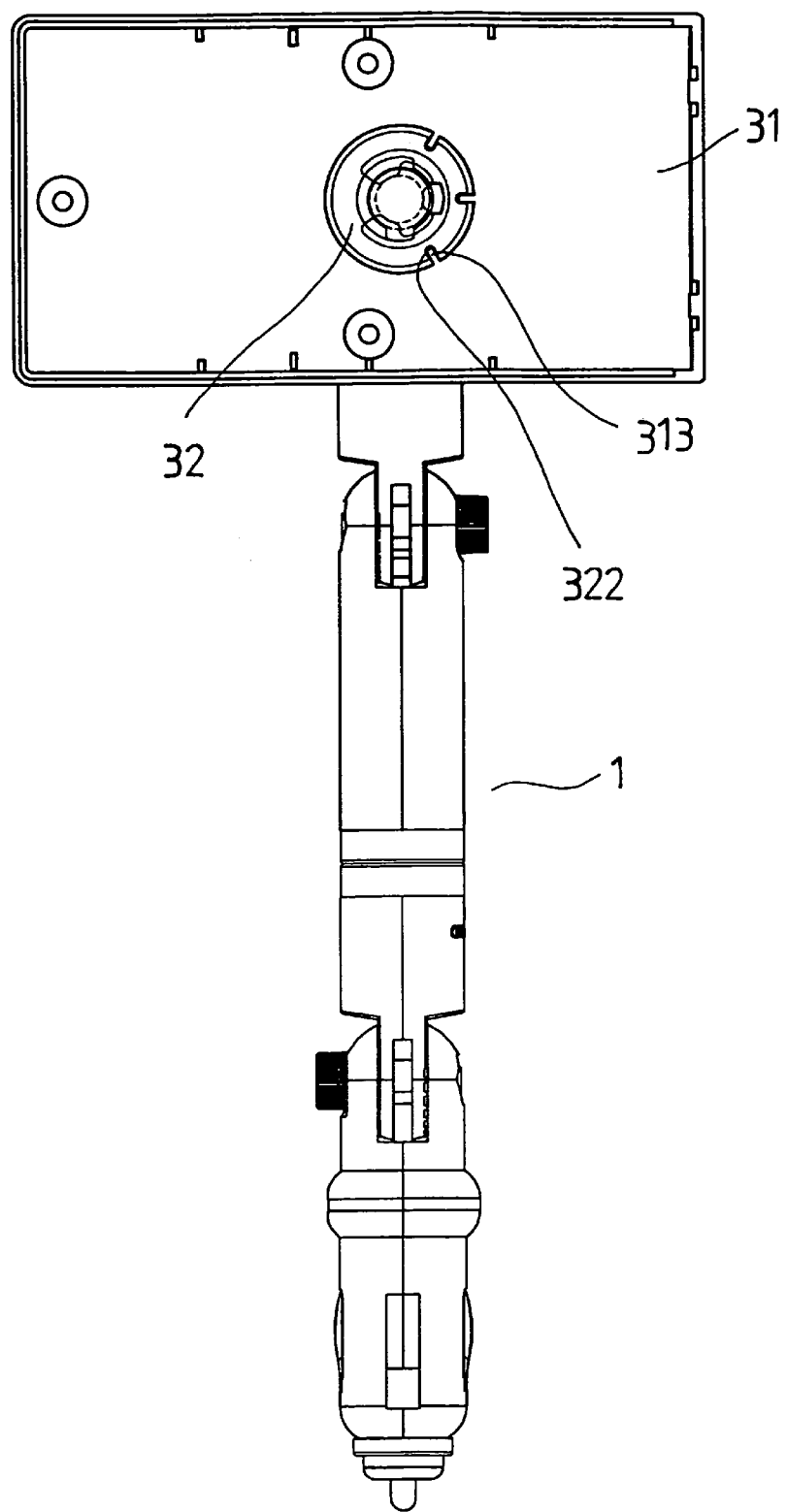
FIG. 8 is a front view of the present invention with the holding unit being turned about a horizontal axis.

The angle main body 21 of the coupling unit 2 is passed through the through hole 311 of the back shell part 31 and the flat ring-shaped pad 32 at the extension portion 215 of the second end portion thereof such that the holding unit 3 can be turned relative to the coupling unit 2; the stopping protrusions 322 of the flat ring-shaped pad 32 will hit the protrusion 216 of the angle main body 21 while the holding unit 3 is being angularly displaced relative to the coupling unit 2. After the extension portion 215 of the angle main body 21 is passed through the back shell part 31, a C-shaped fastener 24 is fitted in the fitting groove 217 to prevent the back shell part 31 from falling off the coupling unit 2. And, the coupling unit 2 is joined to the connecting rod 1 at the connecting member 22 thereof. Therefore, the holding unit 3 can be pivoted about a vertical axis together with the angle main body 21 of the coupling unit 2, as shown in FIG. 5, and it can be turned relative to the coupling unit 2 about a horizontal axis, as shown in FIGS. 7 and 8. Referring to FIGS. 5 and 6, the protrusion 213 of the angle main body 21 of the coupling unit 2 will hit and be stopped by the stopping bumps 22a2 and 22b2 of the connecting member 22 while the holding unit 3 is being turned relative to both the connecting member 22 and the connecting rod 1 together with the angle main body 21 of the coupling unit 2. And, referring to FIGS. 7 and 8, the stopping protrusions 322 of the flat ring-shaped pad 32 will hit and be stopped by the protrusion 216 of the angle main body 21 of the coupling unit 2 while the holding unit 3 is being turned relative to the coupling unit 2 about a horizontal axis. In other words, the pivotal motions of the holding unit 3 and the coupling unit 2 are limited within a certain range.

From the above description, it can be seen that the MP3 device held on the holding unit can be angularly displaced so as to face the user because of the pivotal connection between the holding unit and the coupling unit as well as the pivotal connection between the coupling unit and the articulated rod part of the connecting rod. Therefore, the user can operate the MP3 device conveniently.

What is claimed is:

1. A connecting structure of a holding unit and a connecting rod for an MP3 device, comprising:
   (a) an axially extended connecting rod;
   (b) a coupling unit including:
      an angle main body having first and second end portions perpendicular to each other; the first end portion of the angle main body having an annular recess, an annular protrusion adjacent to a lower edge of the annular recess, and a protrusion on the annular recess;
      a connecting member including left and right shell parts, the connecting member being connected to the first end portion of the angle main body at one end, and the connecting rod at other end thereof so as to allow the angle main body to be turned relative to the connecting rod with the first end portion coaxially disposed relative to the connecting rod; the connecting member having an annular recess on an inner circumferential side thereof, and a plurality of stopping protrusions on the inner annular recess; the connecting member being positioned around the first end portion of the angle main body with the protrusion of the angle main body being confined within the inner annular recess thereof, and the stopping protrusions thereof being confined within the annular recess of the angle main body for limiting turning motion of the angle main body relative to the connecting rod, the left and the right shell parts having a plurality of locating holes and locating protrusions; the locating protrusions being fitted in respective ones of the locating holes when the left and the right shell parts are coupled together; and
      a clamp ring being positioned around both the left and the right shell parts to hold the left and the right shell parts firmly together; and,
   (c) a holding unit for holding an MP3 device, the holding unit including a back shell part; the holding unit being connected to the second end of the angle main body of the coupling unit so as to be turnable relative to the coupling unit;
      whereby the holding unit can be angularly moved about a vertical axis as well as a horizontal one.

2. A connecting structure of a holding unit and a connecting rod for an MP3 device comprising:
   (a) a connecting rod;
   (b) a coupling unit including:
      an angle main body having first and second end portions perpendicular to each other; the first end portion of the angle main body having an annular recess, an annular protrusion adjacent to a lower edge of the annular recess, and a protrusion on the annular recess; and
      a connecting member, the connecting member being connected to the first end portion of the angle main body at one end, and the connecting rod at other end thereof so as to allow the angle main body to be turned relative to the connecting rod; the connecting member having an annular recess on an inner circumferential side thereof, and a plurality of stopping protrusions on the inner annular recess; the connecting member being positioned around the first end portion of the angle main body with the protrusion of the angle main body being confined within the inner annular recess thereof, and the stopping protrusions thereof being confined within the annular recess of the angle main body for limiting turning motion of the angle main body relative to the connecting rod; and
   (c) a holding unit for holding an MP3 device, the holding unit including a back shell part; the holding unit being connected to the second end of the angle main body of the coupling unit so as to be turnable relative to the coupling unit;
      whereby the holding unit can be angularly moved about a vertical axis as well as a horizontal one;
      wherein the connecting member includes left and right shell parts; and,
      wherein a clamp ring is positioned around both the left and the right shell parts to hold the left and the right shell parts firmly together.

3. A connecting structure of a holding unit and a connecting rod for an MP3 device comprising:
   (a) a connecting rod;
   (b) a coupling unit including:
      an angle main body having first and second end portions perpendicular to each other; the first end portion of the angle main body having an annular recess, an annular protrusion adjacent to a lower edge of the annular recess, and a protrusion on the annular recess; and
      a connecting member, the connecting member being connected to the first end portion of the angle main body at one end, and the connecting rod at other end thereof so as to allow the angle main body to be turned relative to the connecting rod; the connecting member having an annular recess on an inner circumferential side thereof, and a plurality of stopping protrusions on the inner annular recess; the connecting member being positioned around the first end portion of the angle main body with the protrusion of the angle main body being confined within the inner annular recess thereof, and the stopping protrusions thereof being confined within the annular recess of the angle main body for limiting turning motion of the angle main body relative to the connecting rod; and (c) a holding unit for holding an MP3 device, the holding unit including a back shell part; the holding unit being connected to the second end of the angle main body of the coupling unit so as to be turnable relative to the coupling unit;

whereby the holding unit can be angularly moved about a vertical axis as well as a horizontal one;

wherein the second end portion of the angle main body of the coupling unit has an annular stopping portion, an extension portion projecting from the stopping portion, and a fitting groove on the extension portion while the back shell part of the holding unit has a through hole; the angle main body of the coupling unit being passed through the through hole of the back shell part at the extension portion of the second end portion thereof; a C-shaped fastener being fitted in the fitting groove to hold the back shell part and the coupling unit together.

4. The connecting structure of a holding unit and a connecting rod for an MP3 device as claimed in claim 3, wherein the back shell part of the holding unit has an encompassing sinking portion around a circumferential edge of the through hole thereof, and a plurality of fixing protrusions on an edge of the sinking portion, and a flat ring-shaped pad is fitted in the encompassing sinking portion of the back shell part; the flat ring-shaped pad has a plurality of gaps on an outward edge thereof, in which the fixing protrusions of the back shell part is fitted.

5. The connecting structure of a holding unit and a connecting rod for an MP3 device as claimed in claim 4, wherein the extension portion of the angle main body has a protrusion thereon, and the flat ring-shaped pad has two stopping protrusions, between which the protrusion of the extension portion is confined.

* * * * *